April 25, 1939.  H. L. BOWERS ET AL  2,155,964

INSULATED STRAINER AND METHOD OF FABRICATING SAME

Filed Oct. 8, 1938

INVENTORS
HERBERT L. BOWERS
NORMAN E. BRICE
BY
*Erin Pick*
ATTORNEY.

Patented Apr. 25, 1939

2,155,964

UNITED STATES PATENT OFFICE 2,155,964

INSULATED STRAINER AND METHOD OF FABRICATING SAME

Herbert L. Bowers, Haworth, and Norman E. Brice, Millburn, N. J., assignors to The Permutit Company, New York, N. Y., a corporation of Delaware Application October 8, 1938, Serial No. 233,936

5 Claims. (Cl. 210—171)

This invention relates to strainers and method of fabricating same and comprises a metal strainer provided with a shank, a bushing of hard rubber permanently attached to the shank, so as to become an integral part thereof and a screw thread formed in the bushing for screwing the strainer assembly into a distributing system.

Water filters, zeolite water softeners and the like are usually provided with inlet and outlet connections at the top and bottom of the tank. The bed of filter sand, zeolite or other material is placed on a supporting bed of graded gravel or the like. In order to obtain uniform distribution of the water passing through the bottom connection of the tank a plurality of uniformly spaced strainers is usually provided, the strainers being attached to a false bottom or to a header-and-lateral pipe system resting on the floor of the tank. For economy of construction the false bottom or header-and-lateral system is customarily made of iron or steel. The strainers, however, have relatively small ports for the passage of water, and in order to prevent the closing of these small ports by corrosion or rusting, the strainers themselves are made of a more corrosion resistant metal, such as bronze.

When bronze strainers are attached to a steel or iron distributing system dissimilar metals come in contact and with the surrounding water acting as an electrolyte, electrolytic corrosion results which rapidly damages and destroys the metal near the points of contact.

In order to prevent such electrolytic corrosion the use of bushings made of electrically insulating material has been suggested whereby direct contact between the strainers and the ferrous distributing system is avoided. Since electrical insulating materials, however, are either of a soft or a brittle nature, the use of insulating bushings has met with difficulties. When a soft material, such as soft rubber, is used for the bushings, they lack rigidity and are readily deformed so that the strainers are apt to become detached from the distributing system during use. Bushings made of a brittle material, on the other hand, such as porcelain, hard rubber or the like, break easily during the process of manufacture, during shipment and handling, and even during use. The contact surfaces of the strainer and the bushing cannot, in practice, be made so as to match perfectly. With imperfect matching, however, high specific pressures are set up at the points of actual contact, and these pressures may be so high as to cause fracture of the brittle insulating material.

The objects of our invention are, first, to provide a strainer in which the insulating material becomes an integral part of the strainer itself; second, to provide an insulated strainer which holds firmly to the distributing system; third, to provide a strainer which can be fabricated with ease and convenience, and at relatively low cost; and, fourth, to prevent damage to the insulating material during handling and use.

We attain these objects by strainers illustrated in the accompanying drawing, in which—

Similar numerals refer to similar parts throughout the several views.

Figure 1:
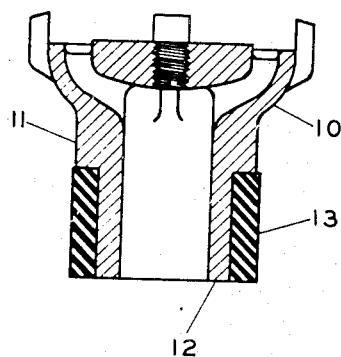
Figure 1 is a vertical section through a strainer body according to our invention, in one stage of fabrication.

Referring to Fig. 1, the cast bronze strainer body 10 has a hexagonal portion 11 to which a wrench may be fitted. The body further has a hollow shank 12 which is left unmachined on its outside so as to retain the rough and uneven surface resulting from the process of casting. A piece of uncured rubber 13, preferably in the form of a suitable length of tubing, is then placed around shank 12. Thereupon the rubber is vulcanized hard. Thus, a hard rubber bushing is formed which makes perfect contact with the shank 12 and has become an integral part of the shank. The bushing is securely held by the cast imperfections in the surface of the shank which are imbedded in the material of the bushing.

Figure 2:
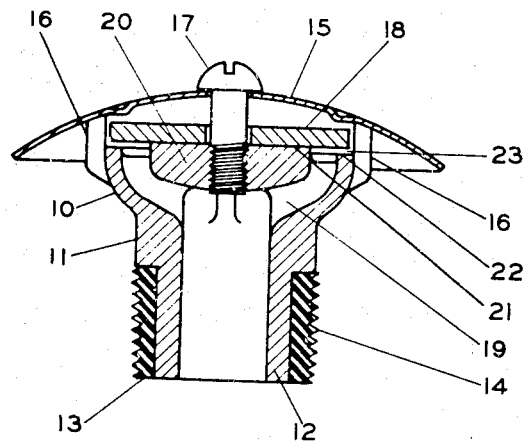
Figure 2 is a section through a strainer comprising the completed body of Fig. 1.

As shown in Fig. 2, a screw thread 14 is then cut in the surface of the bushing 13 by means of which the strainer body may be screwed into suitably tapped holes in a false bottom or header-and-lateral system made of steel or iron.

The particular strainer shown in Fig. 2 has an umbrella hood 15 resting on four narrow lugs 16 projecting from the body 10. The hood 15 is held in place by a screw 17. A flapper plate 18 is loosely fitted over the screw 17 so that it is free to move vertically between the body 10 and the umbrella hood 15. The body further has ribs 19 supporting a central hub 20 into which the screw 17 fits and which is provided with a horizontal face 21. The periphery of body 10 has an annular face 22 at a slightly lower elevation than the face 21. Normally, as shown in Fig. 2, the flapper plate 18 rests on face 21, leaving a narrow circular port 23 between the periphery of the flapper plate and face 22. Water passing downwardly through the filter or softener bed thus flows around the edge of the umbrella hood 15 and enters through port 23 and the hollow shank 12 into the distribution system (not shown). In backwashing the filter or softener bed the flow of water is increased and reversed. Water then enters from the distributing system into the hollow shank 12 and, by its force, lifts the flapper plate 18 until it rests against the lower side of the umbrella hood. The water then leaves the strainer through port 23 which has been made wider by the lifting of the flapper plate. This increase in the port area prevents excessive pressure losses, yet the port remains sufficiently restricted to distribute the water uniformly.

Figure 3:
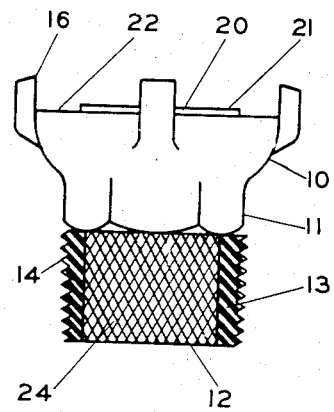
Figure 3 is a view of a modified strainer body with the bushing in section.

In the modified strainer body shown in Fig. 3 the shank 12 is provided with diamond knurling 24 which is imbedded in the bushing 13 and thus provides a secure hold of bushing 13 on shank 12. In place of the knurling 24 the surface of shank 12 may be provided with other types of ridges or grooves, as, for instance circular in shape, to provide a secure hold of bushing 13 on shank 12.

Our invention is adaptable to other types of strainers in which the water distributing ports may for instance, take the form of fixed slots or circular perforations. The body of the strainer may have a shank made in any desired manner, as by drawing or machining, the desired uneven outside surface then being provided by knurling, machining, upsetting or any other suitable method.

The term "hard rubber" as used in describing our invention is understood to include other suitable materials equivalent for the purposes of our invention, such as synthetic compounds suitable for forming on the shank of a strainer a hard, electrically insulating bushing impervious to the corrosive or dissolving action of water.

A strainer made in accordance with our invention has the brittle insulating bushing solidly backed by the metal of the shank so that the bushing is an integral part of the strainer. Therefore, the strainer can be shipped without excessive care. There is no danger of breakage in handling and in use. The strainer is relatively inexpensive to manufacture and can be installed in a minimum of time since no separate bushing need be handled.

What we claim is:

1. A strainer comprising a metallic strainer body, a hollow shank extending from the strainer body, a hard rubber bushing permanently and securely attached to the shank so as to form an integral part thereof, and a screw thread formed on said bushing.

2. A strainer comprising a metallic strainer body, a hollow shank extending from the strainer body, said shank having an uneven surface, a hard rubber bushing permanently and securely attached to the uneven surface of the shank, and a screw thread formed on said bushing.

3. A strainer comprising a metallic strainer body, a hollow shank extending from the strainer body, projections on the outside of said shank, a hard rubber bushing attached to the outside of the shank, said projections being imbedded in the rubber bushing, and a screw thread formed on said bushing.

4. A method of fabricating a strainer which comprises forming a metallic strainer body with a hollow shank thereon, placing rubber around said shank, vulcanizing the rubber to form a hard bushing permanently and securely attached to the shank, and forming a thread on the bushing.

5. A method of fabricating a strainer which comprises forming a metallic strainer body with a hollow shank thereon having an uneven surface, placing rubber over the uneven surface of the shank, vulcanizing the rubber to form a hard bushing permanently and securely attached to the shank, and forming a thread on the bushing.

HERBERT L. BOWERS.
NORMAN E. BRICE.